W. R. CARY.
BORING AND GENERAL USE MACHINE.
APPLICATION FILED MAY 7, 1917.

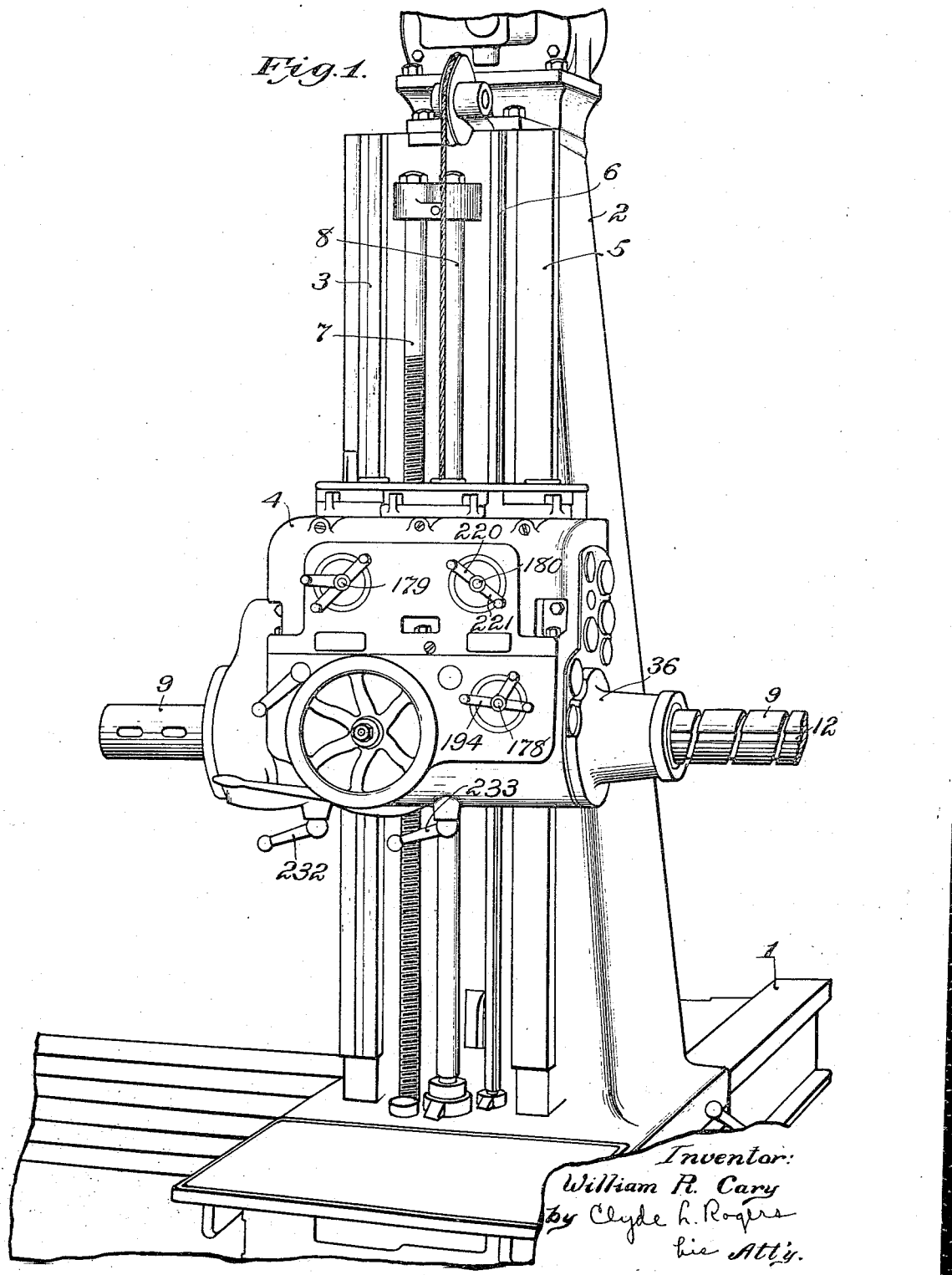

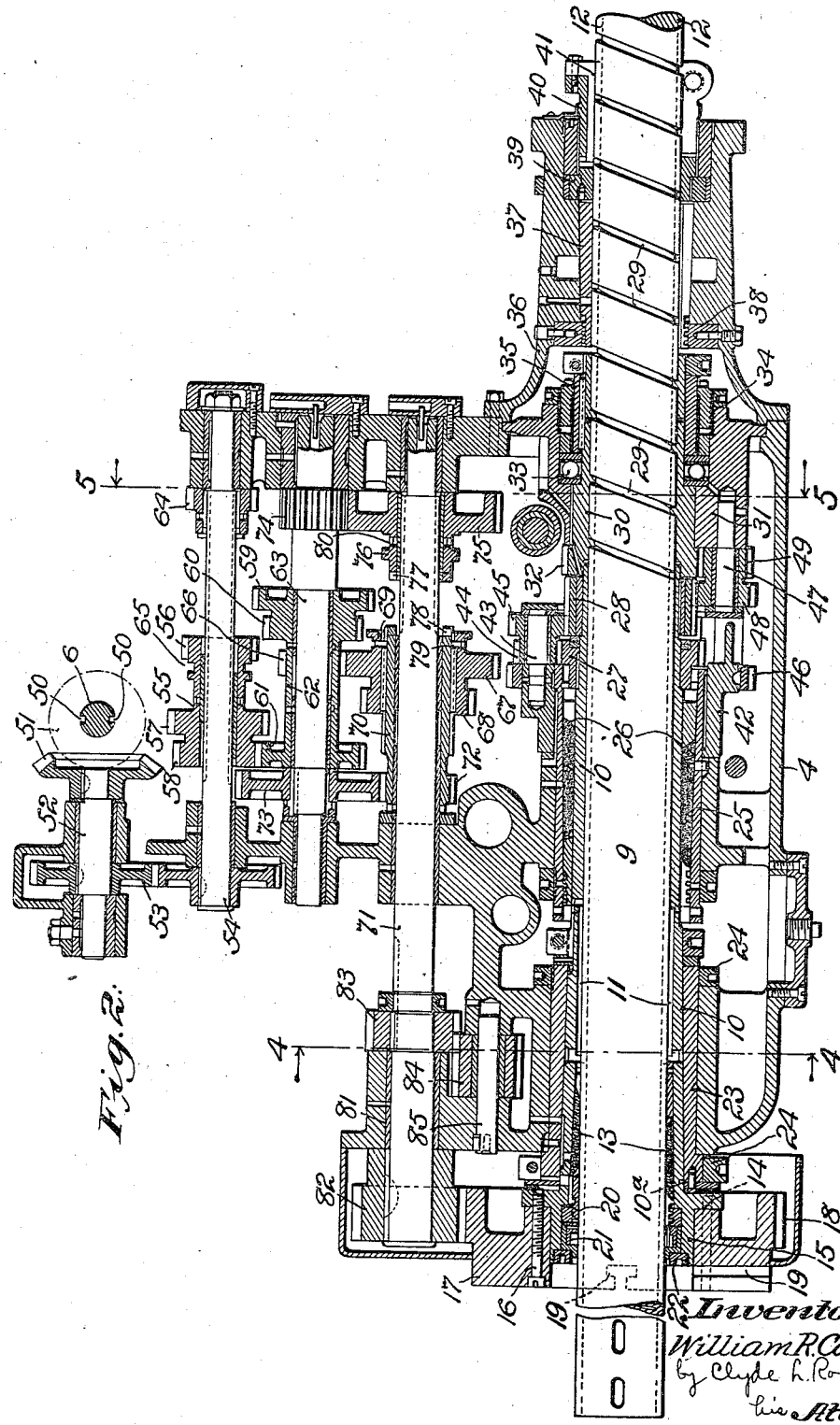

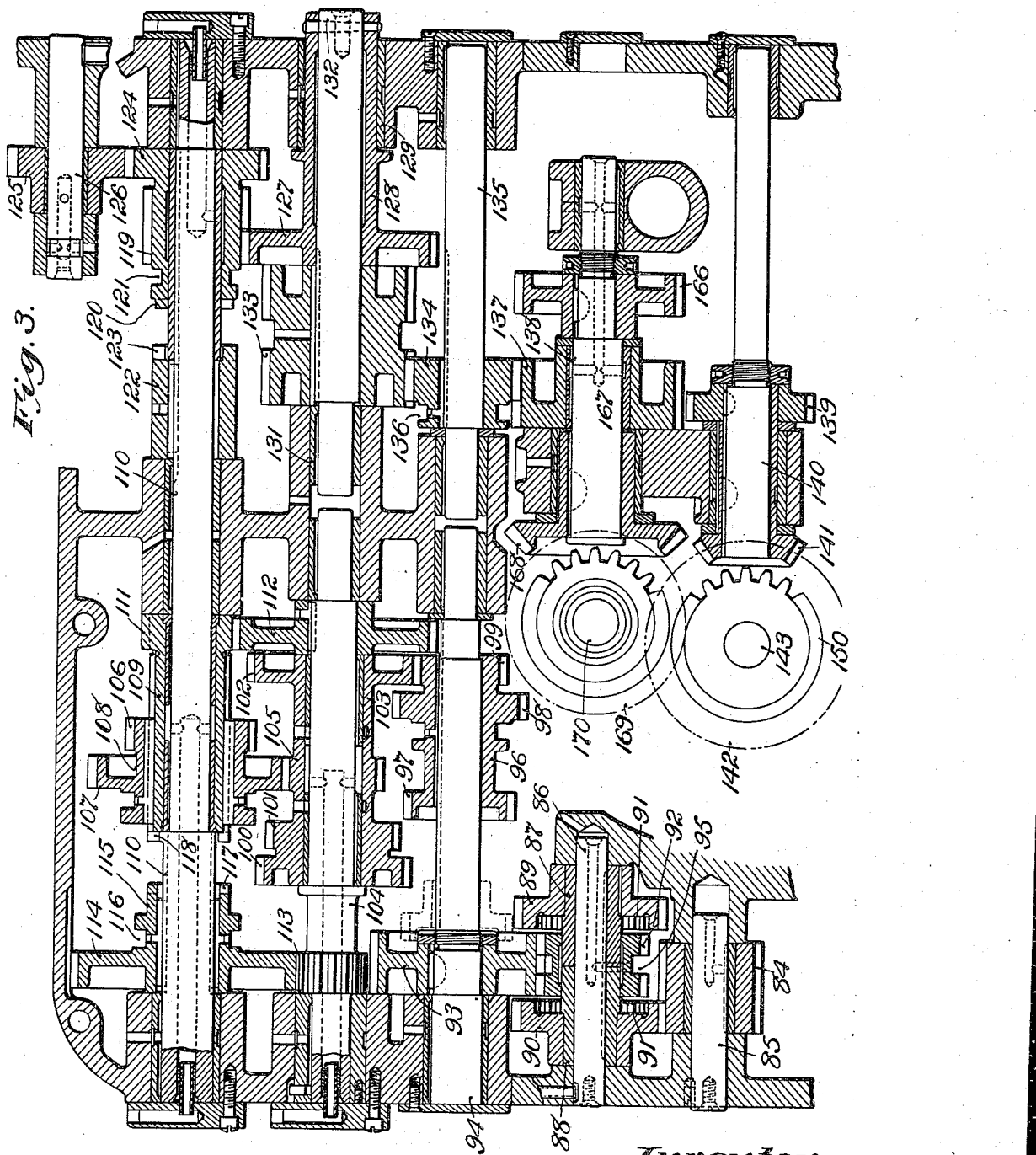

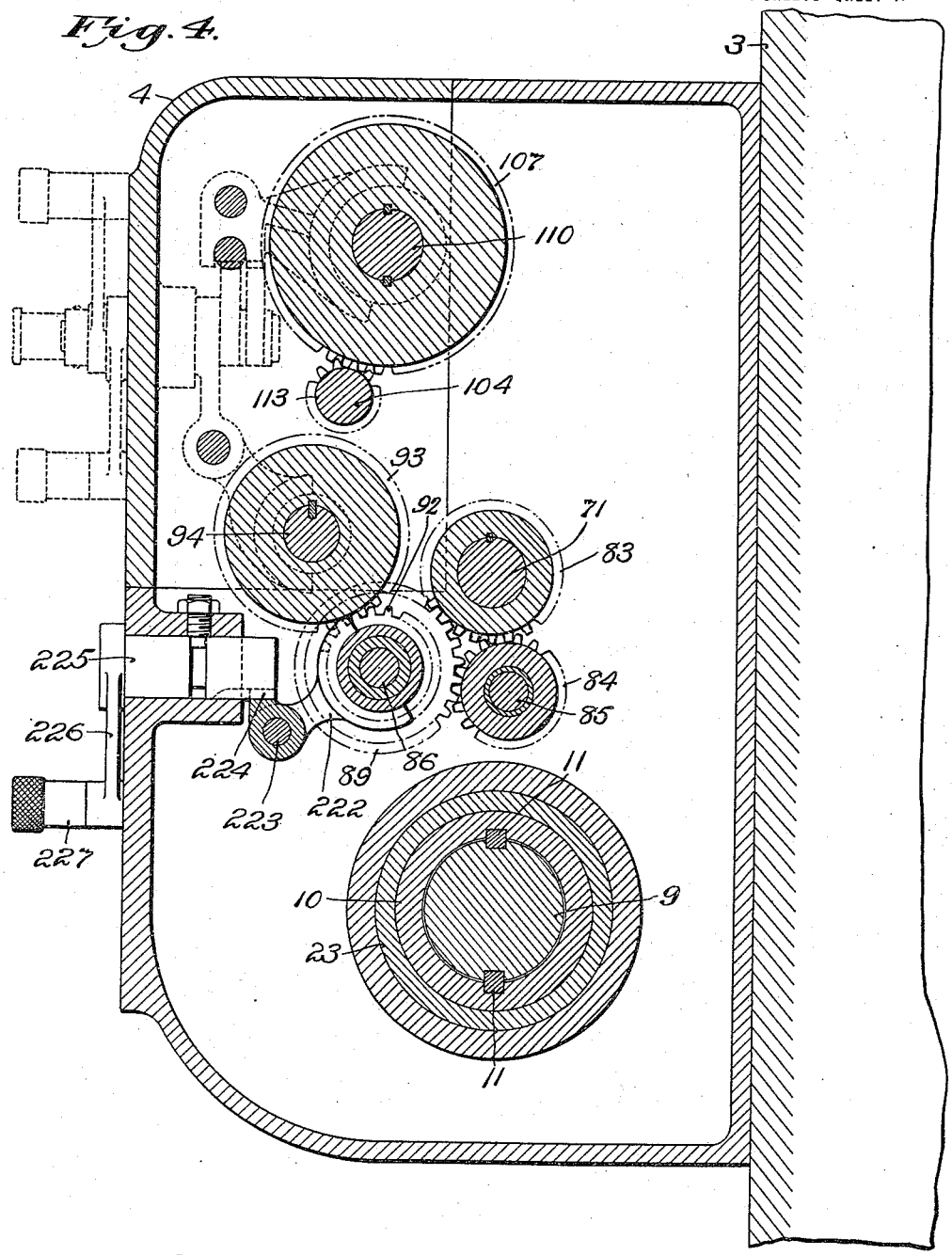

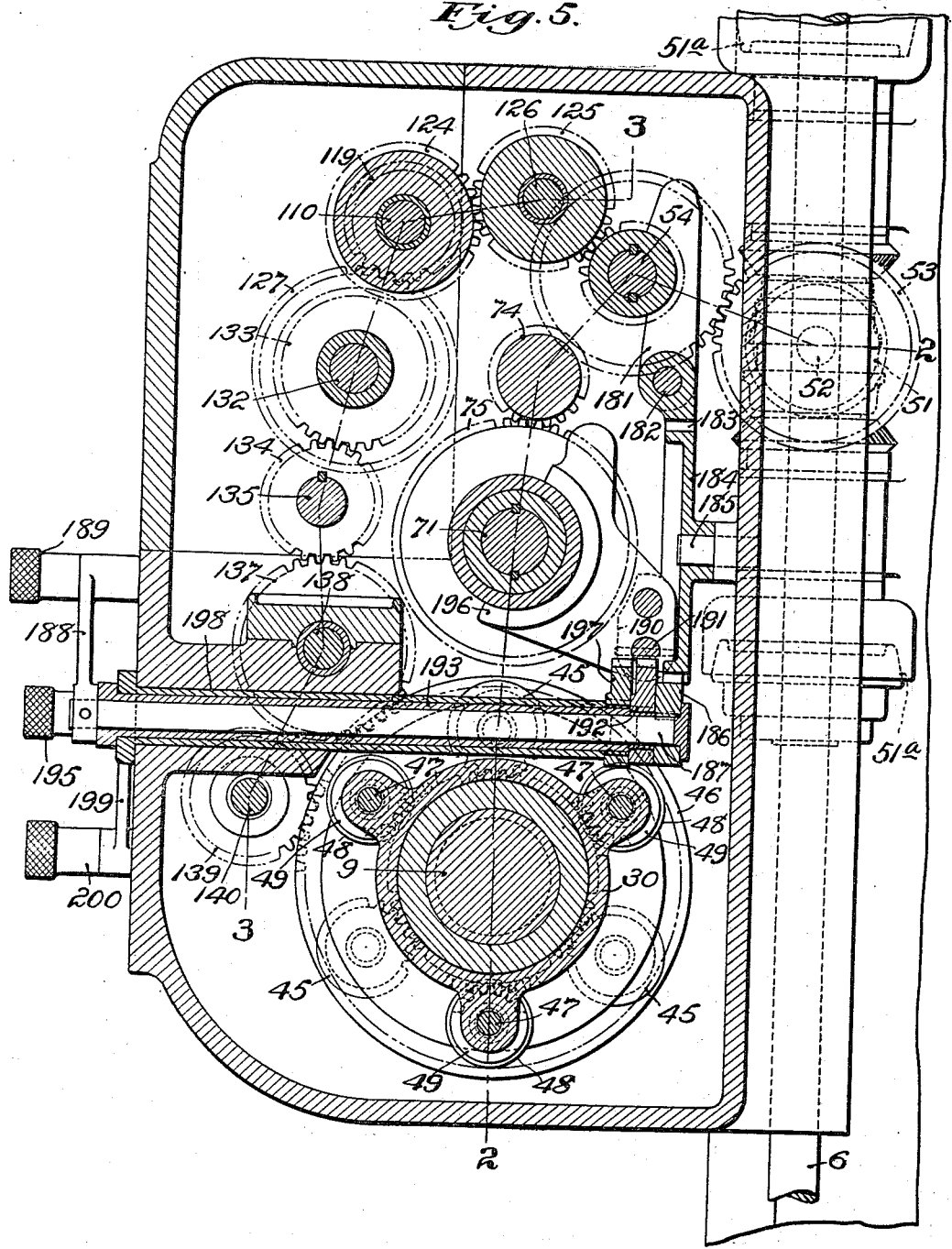

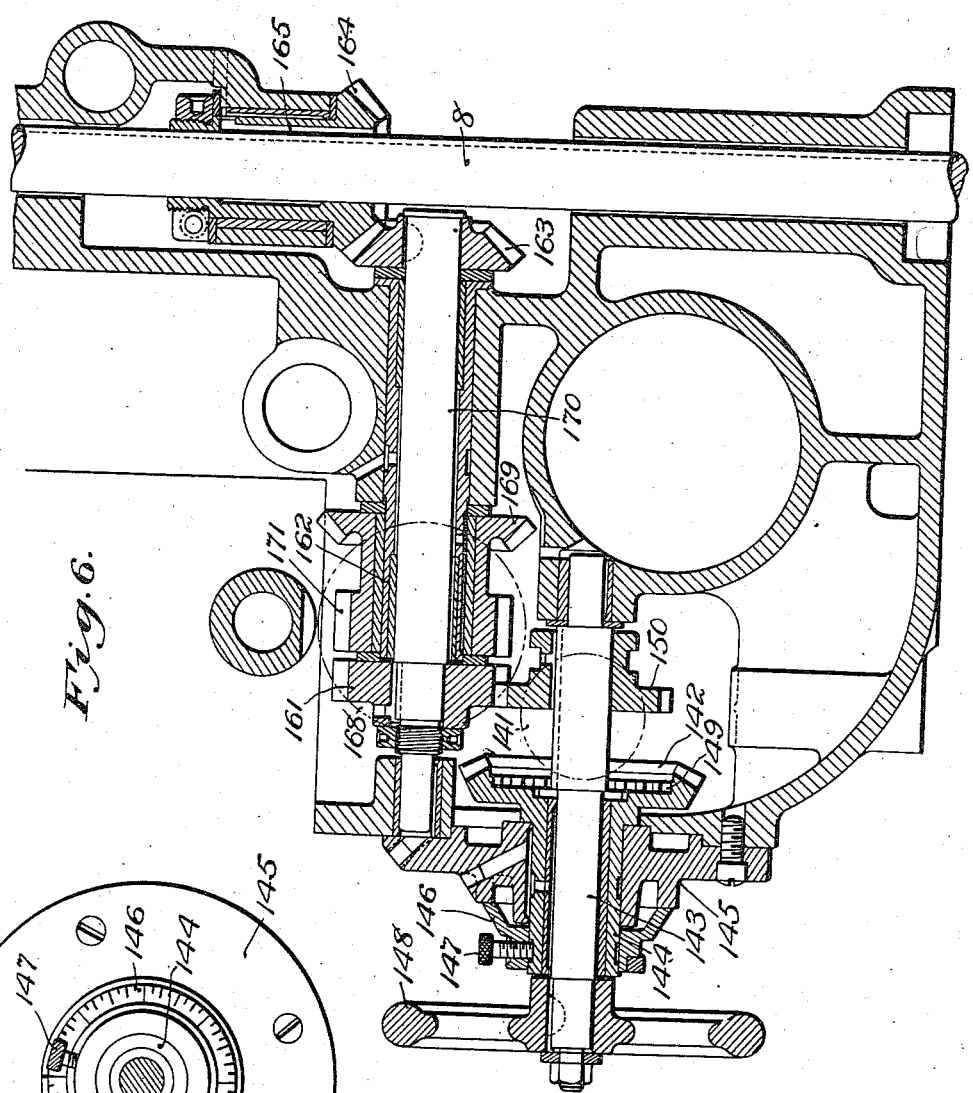

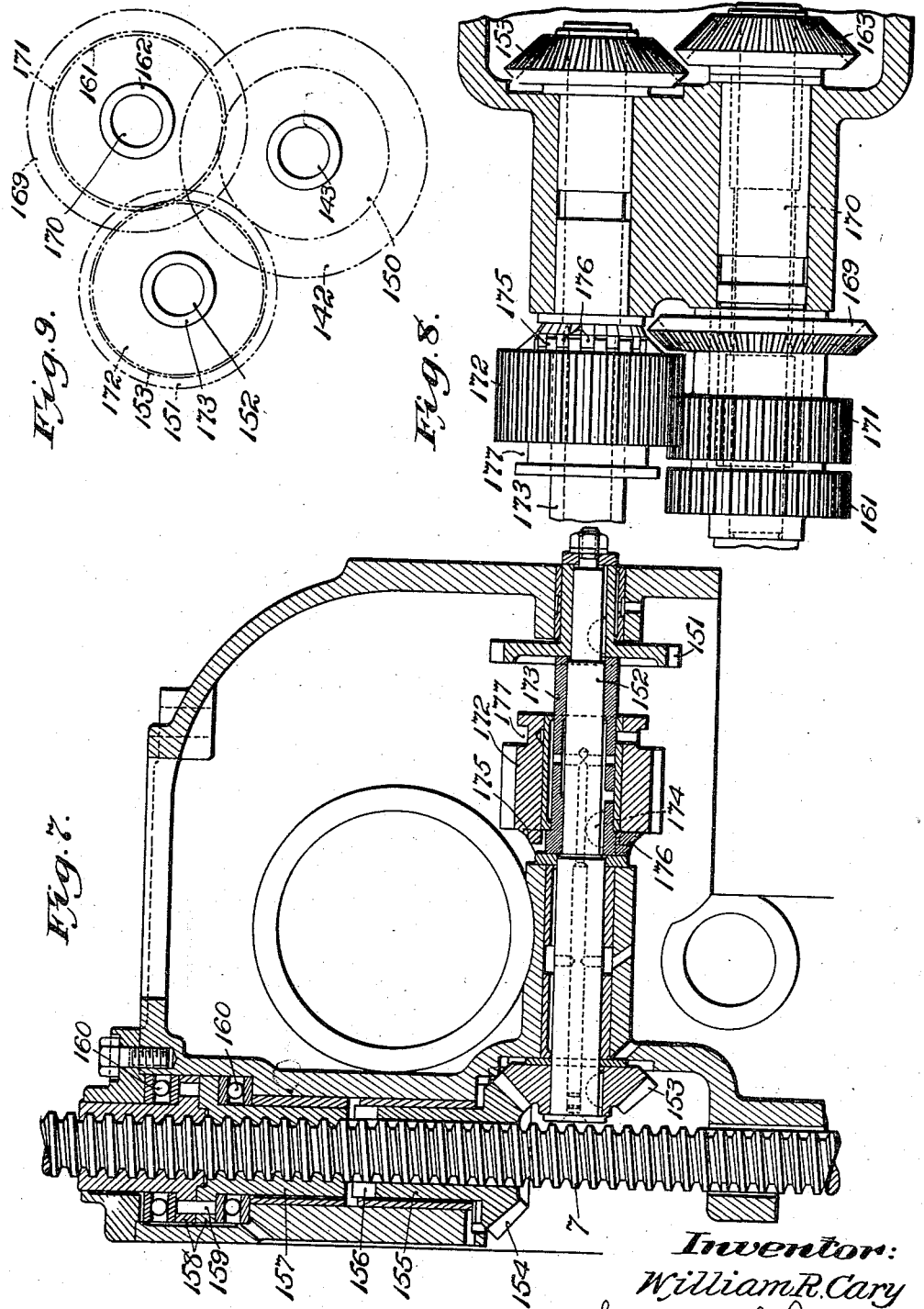

1,244,449.

Patented Oct. 23, 1917.
9 SHEETS—SHEET 8.

Inventor:
William R. Cary
by Clyde L. Rogers
his Atty.

W. R. CARY.
BORING AND GENERAL USE MACHINE.
APPLICATION FILED MAY 7, 1917.

1,244,449.

Patented Oct. 23, 1917.
9 SHEETS—SHEET 9.

Inventor:
William R. Cary
by Clyde L. Rogers
his Atty.

UNITED STATES PATENT OFFICE.

WILLIAM R. CARY, OF CLEVELAND, OHIO, ASSIGNOR TO ARTHUR H. INGLE, OF ROCHESTER, NEW YORK.

BORING AND GENERAL-USE MACHINE.

1,244,449.        Specification of Letters Patent.       Patented Oct. 23, 1917.

Application filed May 7, 1917. Serial No. 166,878.

*To all whom it may concern:*

Be it known that I, WILLIAM R. CARY, a citizen of the United States, and resident of Cleveland, county of Cuyahoga, State of Ohio, have invented an Improvement in Boring and General-Use Machines, of which the following description, in connection with the accompanying drawings, is a specification, like characters on the drawings representing like parts in each of the several views.

This invention relates to metal working machines of a horizontal boring mill type, but which by reason of special combinations and arrangements of drive connections are adapted not only for boring but also for nearly all usual machine shop operations such as milling, drilling, tapping, splining, oil-grooving, rotary-planing, slotting, etc. To render the machine thus adaptable for a wide range of general uses, it is equipped with a tool holding bar having operative connections selectively engageable therewith and combinable, for imparting to the bar either a rotary movement without endwise feed, or an endwise feed without rotary movement, or both rotary and endwise movements in any desired relative ratios, and also having provision for bodily lateral and vertical movement with reference to the work, these bodily movements being either in the nature of a feed of the tool bar with its holding saddle, or a corresponding feed of a work holding table to present the work to the tool bar, the mechanism for operating and controlling the feed in either case being, however, a part of a unitary gear operating and control system housed in the saddle of the machine. For producing rotary and endwise movements of the tool bar in selectively variable ratios with respect to each other I employ a differential gear system acting on a nut engaging a threaded portion of the tool bar, this being generally according to principles shown in the patent to Harker et al. No. 779,931 patented January 10, 1905 and also in the patent to Conradson, No. 1,121,714 patented December 22, 1914.

The general objects of the present invention are to provide a multiple use machine of the type set forth wherein the gearing trains and combinations required for producing an adequate range of speed movements and feed movements of the tool bar, are rendered very much more simple and compact than in prior constructions and wherein the machine as a whole is made stronger and more efficient and reliable. More particularly one important object of the invention has to do with a gear system wherein the speed change mechanism for varying the rate of rotation of the tool bar up to the required range is produced as a unit by itself, and in combination therewith a feed change mechanism for varying the rate of endwise feed of the tool bar, which is also a unitary organization and which takes its drive from the driven end of the speed change system, *i. e.*, from the point where the speed change mechanism is connected to drive the tool bar; this permitting all speed changes to be automatically transmitted as relative feed changes, and permitting also a further complete range of feed changes as permitted by the feed change mechanism. A further object is to provide improved means for mounting and operating the tool spindle or bar, wherein said bar is supported and carried for practically its entire extent within the saddle, in the two sleeves which control and operate the same, the bar being supported throughout the forward portion of its extent in the saddle in an elongated driving sleeve which extends to the front of the saddle, then engaged to the rear of said driving sleeve in the elongated feed nut which is operated by the differential as more fully explained later, and having a further extended bearing in a concentric bearing sleeve at the extreme rear end of the saddle. In accordance with this feature of my invention the driving sleeve for the tool bar which extends to the front of the saddle may be equipped with a face plate which may itself be used to hold work for turning the same or the like, or it may carry an operating tool for rotary planing or like operations. A further object is to provide an improved type of differential device for controlling and operating the feed nut which engages the tool bar, this consisting in a device composed of relatively small external spur gears making the entire differential construction relatively compact, and largely eliminating the effects of momentum therein. A further object is to provide an improved arrangement and system of transmitting rapid traverse movements to the tool bar whereby the rapid traverse operating train, employs to a large extent the same gear elements that are employed for transmitting and distributing the feed movements. A still further object is to provide an improved arrangement and disposition of the elevating screw for the vertical feed movement of the saddle wherein this is arranged close to the main front guide way, thus preventing cramping, this being permitted by a novel connection of the driving and reverse clutch on the vertical prime drive shaft with the first shaft of a change speed system. A still further object is to provide an improved arrangement permitting a hand control of the tool spindle or bar that is relatively direct, without going through the gears of the power reduction and distribution system, or the feed changes. A still further object is to provide an improved arrangement of power distribution selectively engageable for either boring or milling by the shifting of a single gear element, the boring and milling distribution system being preferably, and as shown, in parallel with the speed and feed change systems. A still further object is to provide an improved direct hand control of the spiral feed for the tool spindle that is located at the front of the saddle and permits a direct reading of the bar feed from a suitable graduated head, the relatively direct connection of such graduated device with the tool bar permitting accurate reading, unaffected by variations due to backlash and looseness in the feed change and distribution gear systems. A still further object is to provide an improved arrangement of a safety device consisting in a shear pin or like element located at the driven end of the feed changes and at the beginning of the power distribution system. A still further object is to provide a tool bar equipped with an improved type of thrust bearing permitting the easy and convenient taking up of wear. A still further object is to provide an improved system of power distribution from the tool bar to the saddle and column traverse means whereby the same is rendered more compact and conveniently operable. The foregoing and other objects and advantages of the invention will more fully appear from the following detailed description, and the distinctive features of novelty will be pointed out in the appended claims.

Referring to the drawings:

Figure 1 is a front view in perspective of a machine constructed in accordance with my invention, certain portions being broken away;

Fig. 2 is an irregular lengthwise section partly vertical and partly horizontal through the saddle approximately on line 2—2 of Fig. 5, and showing the speed change system from the prime drive shaft to the tool spindle or bar;

Fig. 3 is an irregular lengthwise section partly vertical and partly horizontal through the saddle approximately on the line 3—3 of Fig. 5, and showing the feed change system and also a portion of the rapid traverse system;

Fig. 4 is a transverse section approximately on line 4—4 of Fig. 2 looking in the direction of the arrows;

Fig. 5 is a transverse section through the saddle approximately on line 5—5 of Fig. 2;

Fig. 6 is a partial transverse vertical section showing the connections for bodily feeding the tool bar with respect to the work either vertically or horizontally, and also for operating the bar by hand;

Fig. 7 is a similar transverse vertical section through the plane of the vertical screw and showing the operative connections thereto;

Fig. 8 is a fragmentary detail showing portions of the distribution for the vertical and horizontal feeds;

Fig. 9 is a diagrammatic end view showing the relation of the shafts and gears in Figs. 6, 7 and 8;

Fig. 10 is a detail front elevation showing a graduated dial associated with the hand operating shaft;

Figure 12:
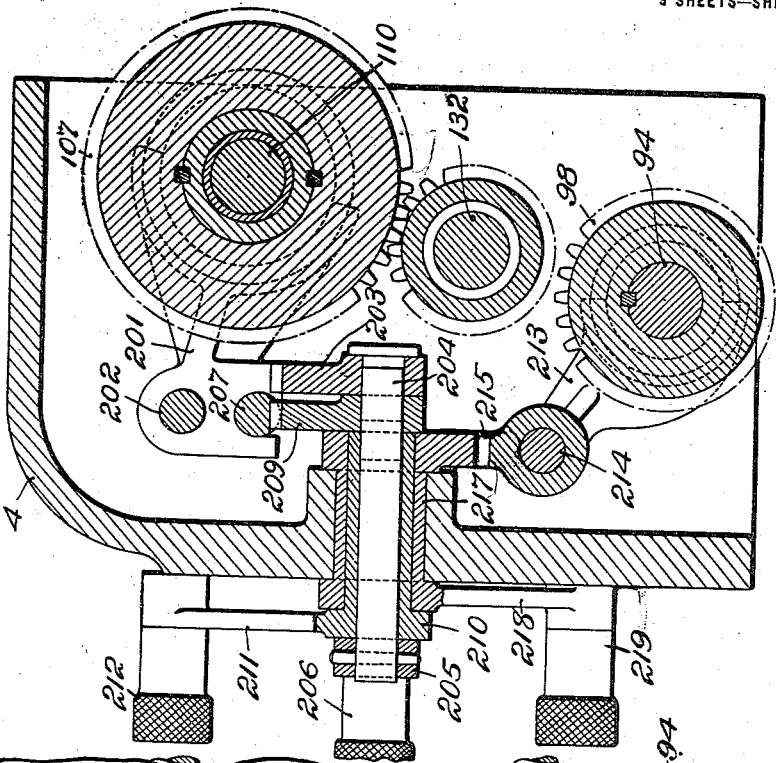
Fig. 12 is a transverse section on line 12—12 of Fig. 11.
Figure 11:
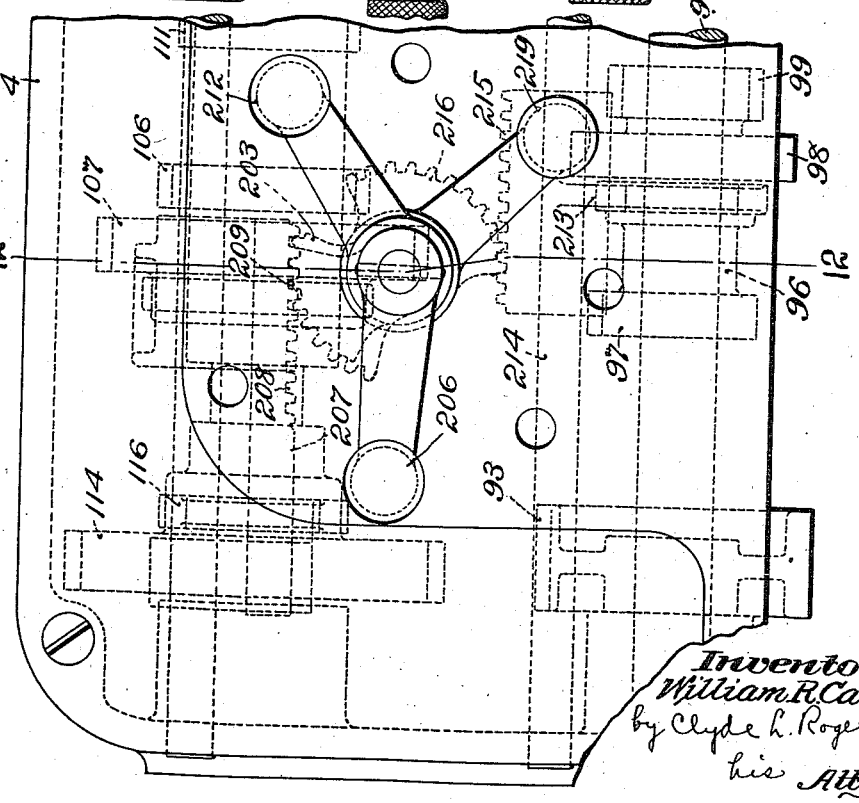
Fig. 11 is a fragmentary front elevation of a portion of the saddle showing portions of the devices for controlling the speed changes.
Figure 14:
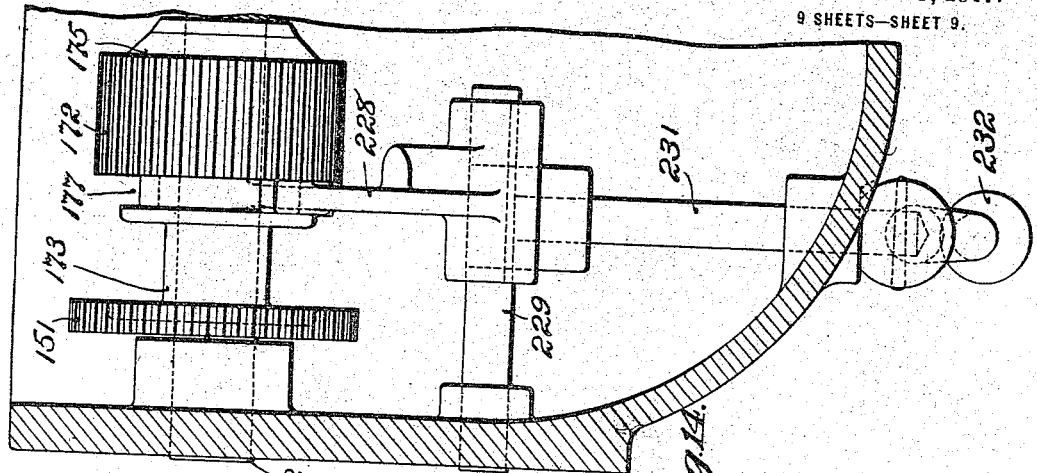
Fig. 14 is a detail showing in side elevation the operating parts of Fig. 13 with a portion of the saddle in section.
Figure 13:
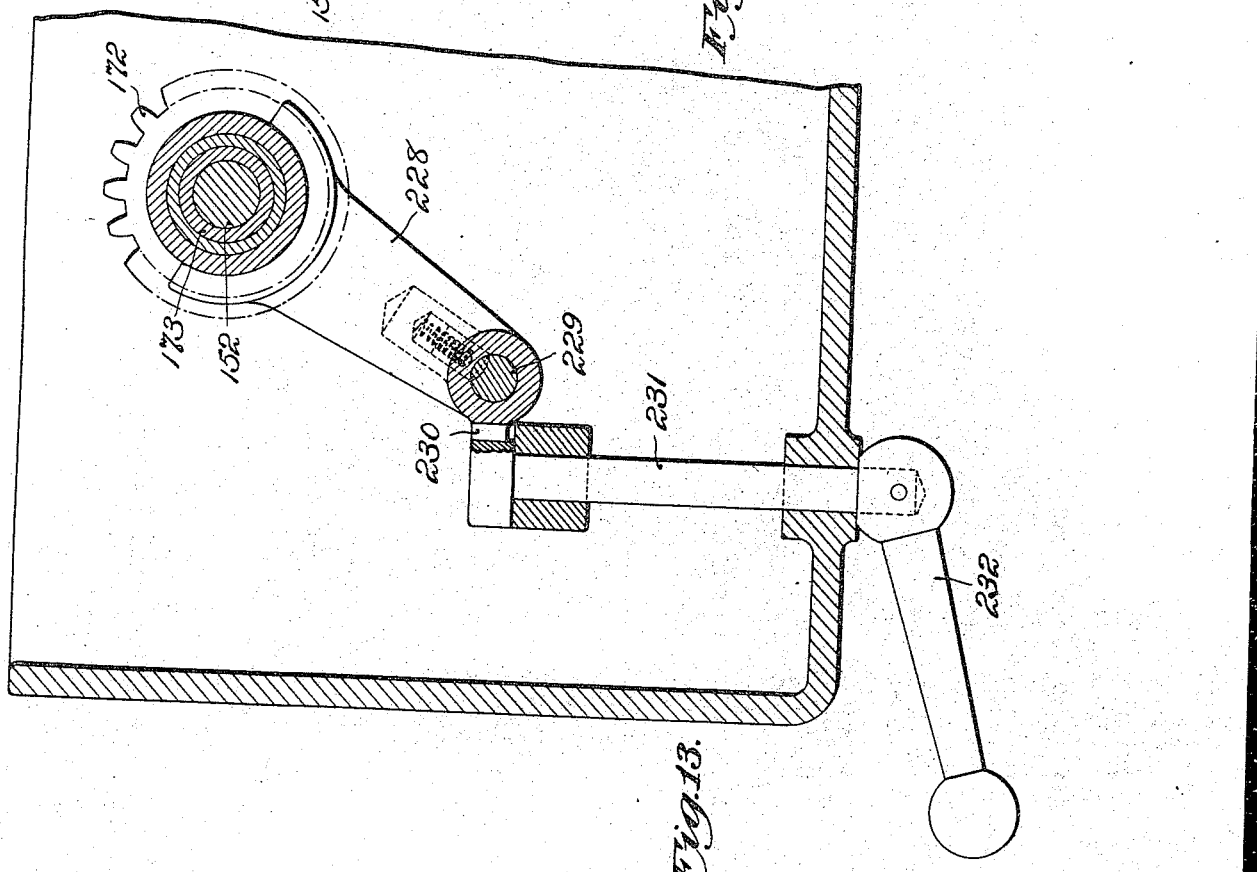
Fig. 13 is a transverse sectional detail showing the device for controlling the milling distribution.

The invention is herein shown as embodied in a machine of the "floor" type, i. e., wherein the upright column is slidably fitted to horizontal ways on a floor plate, and feed movement imparted thereto for feeding the tool bar horizontally, but it is to be understood that this is merely illustrative and that the invention may also be embodied in a machine of the "table" type, wherein the horizontal feed movement is transmitted to a work table instead of to the column which bears the tool saddle. 1 indicates the ways of the floor plate on which is fitted for horizontal feed movement the column 2, this column having at its front a primary guide way 3 for holding and guiding the saddle 4, and spaced therefrom a secondary guide way 5 coöperative for guiding and holding in alinement the saddle.

Vertically fitted in the column 2 are a prime drive shaft 6, an elevating screw 7 for moving the saddle vertically, and a shaft 8 for transmitting power to feed the column horizontally, the connections to these elements being more fully described hereinafter. The saddle 4 has fitted to extend lengthwise through the lower portion thereof a tool bar 9, this tool bar extending in its forward portion through an elongated driving sleeve 10 to which it is slidably keyed on opposite sides as seen at 11, the bar having for this purpose opposite key ways 12 extending throughout the portion thereof which operates in the saddle. The driving sleeve 10 has its forward portion flared out to some little extent away from the bar 9 as seen at 10ª and lubricating packing 13 may be interposed in the space thus provided. A little distance from its outer extremity the driving sleeve is equipped with a radial flange 14 and thence outward with a cylindrical collar 15 constituting a seat on which may be secured as by bolts 16 a face plate 17 which also constitutes a driving member for the sleeve 10 having for this purpose peripheral spur gear teeth 18. The face plate 7 may be equipped with radially extending undercut T-slots 19 permitting a work piece or an operating tool to be clamped to the face thereof in operative relation when desired. The outer end of the driving sleeve 10 including the collar 15 is also internally recessed to form a seat for an inserted front bearing of the spindle as indicated at 20 and also a seat for a spindle wiper 21 fitted in place in front of the spindle bearing 20, both these elements being held in position by a ring nut 22 set into the end of the collar 15; the wiper 21 being composed as shown of coöperating annular flange members, together constituting an annular recess in which suitable wiper packing may be held. The forward outwardly tapering portion 10ª of the sleeve 10 is fitted to, and journaled in a bearing bushing 23 which is set into a cylindrical bore therefor of the saddle 4 and held in adjustment by suitable ring nuts 24. By reason of the tapered coöperative bearing surfaces of the driving sleeve portion 10ª, and the interior of the bushing 23, it will be understood that an endwise adjustment of the bushing 23 is effective to take up wear and keep the driving sleeve closely adjusted in its bearing. The rearward portion of the driving sleeve 10 is fitted in a rear bearing bushing 25 likewise fitted in a bore of the saddle, there being as shown a space provided within this bushing to receive lubricating packing 26. Adjacent its inner end the sleeve 10 has keyed thereto a spur gear 27 coöperating with, and constituting a part of the differential device for operating the feed nut as later more fully explained. An annular spur gear 28 of relatively wide face is rotatably journaled on the inner extremity of the sleeve 10 adjacent the gear 27, this also constituting a part of the feed nut controlling differential as will hereinafter more fully appear. The rearward or inner portion of the bar 9 is formed with screw threads 29 shown as of relatively coarse pitch and deep, the threads being preferably square in cross section. Engaged with this threaded portion of the bar is a relatively long feed nut 30 in the form of a sleeve journaled in bearings of a hollow block 31 removably fitted in the saddle. The nut 30 as shown extends up close to the inner extremity of the driving sleeve 10 and at its inner end it has formed thereon a spur gear 32 which is thus adjacent the ring gear 28, the gear 32 being slightly larger than the gear 28 as shown. The nut 30 is shouldered to engage a ball bearing 33 fitted into a recess of the bearing block 31 and held in place by a bearing collar 34 removably and adjustably fitted into the bearing block 31, the inner portion of the sleeve nut 30 being shown as equipped with a bearing collar 35 keyed thereto and having a bearing fit in the fixed bearing collar 34. A projecting hub or bonnet 36 is removably bolted to the inner end of the saddle, the inner portion of the tool bar extending through this bonnet which is equipped with a tapering bush sleeve 37 constituting an inner bearing for the tool bar, so that the tool bar thus has a bearing support at each side of the nut 30. The tapering bushing 37 may be taken up for wear by a ring nut 38 engaged with its inner end and acting against a shoulder of the bonnet 36. The outer portion of the bonnet 36 is recessed to provide bearing for a milling thrust collar 39 which may be clamped fixedly to the tool bar when the machine is to be used for milling without endwise movement of the tool bar, and also affording bearing for a clamp 40 having keys 41 engaging the lengthwise grooves 12 of the tool bar to hold the bar against all rotary movement when the machine is to be used for straight reciprocating cuts, e. g., for splining and the like. Rotatably fitted on the exterior of an inner portion of the bearing bushing 25 is a hub 42 bearing a series, shown as three in number, of equally spaced apart endwise projecting pivot pins 43 on each of which is mounted a pinion block composed of a smaller pinion 44 and a larger pinion 45 integral or rigid therewith. The pinions 44 mesh with the gear 27 which is fixed on the driving sleeve 10, while the pinions 45 mesh with the gear ring 28 which is loosely journaled on said sleeve. The rotatable hub 42 also has fixed thereto a gear ring 46 encircling the same, this gear ring being operatively engaged by a driven connection from the feed change system as later made clear. Fixed to the saddle, i. e., as shown in the bearing block 31 are a spaced apart series of endwise projecting pivot pins 47 on which are journaled pinion blocks composed of larger pinions 48 and smaller pinions 49 rigid or integral therewith, the pinions of these pinion blocks being of the same relative sizes as the pinions 44, 45. The pinions 48 mesh with the loosely journaled intermediate gear 28, while the pinions 49 mesh with the gear 32 carried at the inner end of the feed nut 30. It may now be understood that when the gear ring 46 and hub 42 are held from rotation, the gear 27 will transmit a drive from the sleeve 10 through the pinions 44, 45, thence through the loose intermediate 28, and the pinions 48, 49 to the gear 32 of the feed nut which will cause the feed nut to turn at the same rate as the tool bar 9, so that no endwise movement of the tool bar is produced. Further that upon a rotary driving movement being imparted to the gear ring 46 since the pivot pins 43 of the pinions 44, 45 will then be revolved, that a differential effect will thus be produced, that will cause the nut 30 to be rotated with reference to the tool bar 9 at a rate corresponding to the rate of drive of the gear ring 46, thus causing an endwise movement of the tool bar at a variable ratio with respect to its endwise movement, and capable of selective changes in such feed ratio according to the rate of driving impulse to the gear ring 46. It will further be noted that by holding the driving sleeve 10 stationary and imparting a drive wholly to the gear ring 46 the feed nut 30 will be operated to feed the tool bar endwise without rotary movement.

For transmitting driving impulse from the vertical prime drive shaft 6 to the gear 18 for rotating the driving sleeve 10 and hence the tool bar, a change gear system is mounted in the saddle having a wide range of selective speed changes. The vertical prime drive shaft 6 has opposite key ways 50 for transmitting power through bevel gearing 51 to a shaft 52 horizontally journaled at the rear of the saddle and which may be termed the "first speed" shaft. The shaft 6 may drive this shaft 52 with the interposition of a bevel gear reverse device and with friction safety clutches 51ª similarly as shown in the above mentioned Conradson patent. This friction clutch and reverse mechanism which is arranged on the vertical shaft 6 being directly in geared connection with the first speed shaft 52 which extends to one side of said vertical shaft in parallelism with the rest of the series of change speed shafts economizes in space and affords clearance so that the elevating screw 7 may be located close to the front or main guiding way 3 of the saddle; this insuring the free and easy operation of the saddle on said vertical way without tendency to cramping. The first speed shaft 52 through mating spur gears 53 drives a second speed shaft 54 journaled in the saddle and having slidably keyed thereon a pinion block 55 comprising three pinions 56, 57, 58 of diverse sizes and spaced apart so as to permit selective meshing with a coöperative set of gears 59, 60, 61 also spaced apart and formed into a gear block with an intermediate sleeve 62, this gear block being rotatably journaled loosely on a shaft 63 journaled in the saddle which may be termed the "third speed" shaft. The shaft 54 also has keyed thereon a pinion 64 which constitutes the driving member of a rapid traverse system to be later more fully explained. Thus by adjusting the pinion block 55 endwise the shaft 63 may be driven at any one of the three selective speeds from the shaft 54, the pinion block 55 being for this purpose equipped with an annular groove 65 engageable by a suitable shifter arm. The gear block sleeve 62 also has fixed thereon a pinion 66 spaced a substantial distance from the gear 61, and the pinion 66 and gear 61 are selectively engageable by larger and smaller gears 67, 68 on a gear block 69 slidably keyed on a sleeve 70 rotatably journaled loosely on a shaft 71 journaled in the saddle which may be termed the "fourth speed" shaft. The sleeve 70 also has formed therewith a pinion 72 engageable with a larger gear 73 keyed on the shaft 63 and the shaft 63 has fixed thereon a pinion 74 adapted to mesh with a larger gear 75 slidably keyed on the shaft 71 and having rigid therewith a hub collar 76 having at its end a clutch face 77 engageable with a coöperative clutch face 78 at the adjacent end of the sleeve 70. The spacing of the clutch faces 77, 78 with respect to the gears 74, 75 is such that upon the sliding endwise of the gear 75 on the shaft 71, said gear moves out of mesh with the pinion 74 before the clutch faces 77, 78 come into engagement. With this arrangement the three speed changes possible by the adjustment of the pinion block 55 are doubled by sliding adjustment of the gears 67, 68 on the sleeve 70, i. e., by the selective meshing of the gears 66, 67 or the gears 61, 68. Thus the sleeve 70 has six speed changes. These speed changes as transmitted to the shaft 71 are doubled, since the shaft 71 can be driven from the sleeve 70 either through the gears 72, 73, 74, 75, or the gear 75 can be driven direct from the sleeve 70 by the engagement of the clutch faces 77, 78. The gear block 69 is formed with a suitable annular groove 79 to receive a shifter arm and the hub collar 76 is formed with a similar groove 80 to receive a shifter. The fourth speed shaft 71 projects forwardly of the saddle and its forward end has bearing at 81 in an extension of the apron, the extremity of said shaft having keyed thereon a pinion 82 meshing with the gear 18 to drive the face plate 17 and thus the tool bar. Just inward of the bearing 81 the shaft 71 also has keyed thereon a pinion 83 constituting a driving member for connecting with the feed gear train for forward operation thereof. The pinion 83 is adapted to mesh with an intermediate pinion 84 journaled on a pin 85 and held from endwise movement in the saddle, this pinion 84 serving as an intermediate for operating the feed gear train for a reverse movement thereof as later more fully explained, and as shown best in Fig. 3. Thus since the drive for the feed gear train is from the shaft 71 which is directly connected with the rotating drive of the tool bar, all speed changes, twelve in number as described, automatically give relative changes of feed, i. e., the feeds are in this way automatically varied in accordance with the rate of rotation of the tool bar.

In accordance with my invention a system of feed changes from the driving connection thus provided, is incorporated as a part of the operating mechanism, and preferably housed in the saddle in juxtaposition to the speed change mechanism just described. For this purpose a short shaft 86 fitted in the saddle has fitted thereon shouldered sleeves 87, 88 on which are rotatably mounted spur gears 89, 90 held spaced apart by the shoulders of said sleeves. These spur gears have clutch recesses 91 on their inner opposing faces adapted to be selectively engaged with a clutch head 92 slidably and rotatably mounted on the inner portions of the sleeves 87, 88, this clutch head also constituting a spur pinion constantly meshing with a spur gear 93 fixedly keyed on a shaft 94 journaled in the saddle and which may be termed the "first feed" shaft. The pinion 89 meshes with the forward feed driving pinion 83 on the shaft 71, while the pinion 90 meshes with the intermediate reverse pinion 84. Thus by shifting the clutch head pinion 92 into engagement with the pinion 89, the forward feed is engaged, while upon shifting said head into engagement with the pinion 90 the reverse feed is engaged. The clutch head 92 has an intermediate annular groove 95 adapted to receive a suitable shifter arm. Slidably keyed on the shaft 94 is a pinion block 96 equipped with spaced apart pinions 97, 98, 99 of diverse sizes, these pinions adapted to selectively engage the several pinions 100, 101 and 102 spaced apart on a gear sleeve 103 rotatably journaled loosely and held from endwise movement on a shaft 104 journaled in the saddle and which may be termed the "second feed" shaft. Thus the shaft 104 may be driven at any one of a range of three speeds with reference to the rate of the shaft 94 by shifting adjustment of the pinion block 96. The gear sleeve 103 is also equipped with an intermediate pinion 105 spaced from the gear 102. These gears 102, 105 are selectively engageable by gears 106, 107 respectively carried on a gear block 108 slidably keyed on a sleeve 109 loosely journaled and held from endwise movement on a shaft 110 journaled in the saddle and which may be termed the "third feed" shaft. The sleeve 109 is equipped at its inner end with a pinion 111 rigid therewith which meshes constantly with a relatively large gear 112 fixedly keyed on the shaft 104. The shaft 104 also has formed therewith or fixed thereto a relatively small pinion 113 which is adapted to mesh with a relatively large gear 114 slidably keyed on the shaft 110, when said gear is shifted to one of its limits of movement, i. e., to the left as seen in Fig. 6, and being out of mesh with the pinion 113 when shifted to the right as seen in said figure. The gear 114 is equipped with a hub collar 115 having an annular groove 116 to receive a suitable shifter arm. Thus it will be observed that for each of the three speeds imparted to the gear sleeve 105, two selective speeds may be transmitted to the sleeve 109, by shifting the gear block 108, this making six feed changes obtainable in the sleeve 109. Then the shaft 110 may be driven at either of two rates for each of the feed changes of the sleeve 109 by either driving the shaft 110 from the sleeve 109 through gears 111, 112, 113, 114, this being at a relatively reduced rate, while upon a shifting of the gear 114 to the right, it is disengaged from the pinion 113, and a clutch face 117 on the end of the collar 115 thereof is engaged with a coöperative clutch face 118 at the end of the sleeve 109, thus driving the shaft 110 directly from the sleeve 109. Thus twelve feed changes are obtainable in the third feed shaft 110 for each speed of drive imparted from the pinion 83 which may be considered the prime driver of the feed change system.

In accordance with my invention the feed change system of the machine is in part associated with the rapid traverse system, this bringing about greater compactness and making for simplicity since in the power distribution it is possible to use in part the same transmission and reduction gears for the rapid traverse that are employed in the feed distribution system. In carrying out this feature of the invention in the present embodiment, the shaft 110 is extended to the right as seen in Fig. 3 across the saddle and its right end portion has slidably and rotatably fitted thereon an elongated gear pinion 119 having a hub collar formed with a clutch face 120 and also with an annular groove 121 to receive a shifter arm. The shaft 110 has fixedly keyed thereto a clutch collar 122 equipped with a clutch face 123 adapted to engage with the clutch face 120 when the pinion 119 is shifted to the left as seen in Fig. 6. The pinion 119 has rigid therewith a relatively narrow faced, larger pinion 124 engaged by a pinion 125 journaled on a stub-shaft 126 of the saddle. When the pinions 119, 124 are shifted to the right, i. e., when the clutch faces 120, 123 are disengaged, the pinion 125 constitutes an intermediate gear of the rapid traverse gear train being driven from the pinion 64 which as already explained is keyed on the shaft 54, so that the wide faced pinion 119 when thus adjusted constitutes an element of the rapid traverse gear train and system. When pinions 119, 124 are shifted to the left, however, the pinions 124, 125 are disengaged and the clutch faces 120, 123 are engaged so that the pinion 119 is then connected to the shaft 110 and constitutes an element of the feed change train of gears and system and is disconnected from the rapid traverse system, i. e., when the pinion 119 is connected to constitute an element of the feed change system, it is disengaged from the rapid traverse system and vice versa. The wide faced pinion 119 is constantly in mesh with a relatively large gear 127 having an elongated hub sleeve 128 fitted in bearings 129 of the saddle and having fitted therethrough a shaft 130, the inner end of which is journaled in the saddle at 131 and which may be termed the "fourth feed" shaft. The hub collar 128 is connected to drive the shaft 130 through a transverse pin 132 which passes through an outer end of the shaft 130, and through a portion of the sleeve 128 which projects without the saddle, so that the pin 132 is readily accessible for renewal when required. This pin 132 constitutes a safety shear pin being for this purpose of relatively soft metal capable of transmitting normal operative strains, but designed so as to be sheared off upon encountering undue strains, so as to protect the other parts of the gear train from damage. The shaft 130 has keyed thereon a wide faced or double gear 133 which is in driven engagement with a pinion 134 slidably keyed on a shaft 135 journaled in the saddle, and which may be termed the "fifth feed" shaft. The pinion 134 has a hub collar formed with an annular groove 136 to receive a shifter arm. In one position of its shifting adjustment, i. e., when shifted to the left as shown in Fig. 3, the pinion 134 is in mesh with the gear 137 loosely fitted on a shaft 138 journaled in the saddle. The gear 137 engages the ring gear 46, which as explained operates the differential to control the rotation of the feed nut 30 with respect to the tool bar. The ring gear 46 also has meshing therewith a pinion gear 139 keyed on a shaft 140 journaled in the saddle and connected by a pair of meshing bevel gears 141, 142 with a hand operating shaft 143 journaled transversely in the saddle. The bevel gear 142 has formed therewith an elongated collar 144 fitted in bearings of a head 145 set into the front of the saddle. Adjustably fitted on the sleeve 144 is a flaring disk 146, adapted to be set adjustably with reference to the sleeve 144 by means of a holding pin 147 extending radially therethrough, the adjustable disk head 146 being graduated with reference to suitable corresponding indicia on the fixed head 145 to serve as an indicator with reference to the feeding of the bar. The shaft 143 is equipped with a hand wheel 148 for turning said shaft manually. The gear 142 is normally loose on the shaft 143 and for clutching said gear to said shaft it is formed with an internal recess 149 constituting a clutch socket into which is adapted to engage a gear 150 slidably keyed on the shaft 143 when said gear 150 is shifted to one limit of its movement, i. e., as shown to the left in Fig. 7, this connecting up the manual operating shaft 143 to turn the ring gear 46 for hand feeding of the bar. When the shiftable gear 150 is moved to an intermediate position it engages with a relatively narrow faced gear 151 keyed on a shaft 152 journaled transversely in the saddle and having at its inner end a bevel pinion 153 meshing with a pinion 154 fitted on the vertical feed screw 7, the pinion 154 having an elongated sleeve 155 formed therewith driving through a clutch engagement 156 a two part nut 157 journaled and held from endwise movement in the column, the two parts of this nut having radial flanges 158 fitting together and held to turn as one by pins 159, suitable ball bearings 160 being provided at each side of these flanges. Thus upon shifting the gear 150 to middle position, the saddle may be moved vertically on the column by the hand wheel 148. Upon shifting the gear 150 to its other limiting position, i. e., to the right as seen in Fig. 7, it is brought into mesh with a gear 161 keyed on a shaft 162 journaled transversely in the saddle, this shaft having keyed at its inner end a bevel gear 163 meshing with a bevel gear 164 journaled and held from endwise movement in the saddle, the pinion 164 having an elongated collar formed therewith slidably keyed as seen at 165 to the vertical shaft 8 which is connected to operate the column feed to move the saddle and tool bar with the column, horizontally for horizontal milling; it being understood that in the so-called "table" type of machine, e. g., as shown in the patent to Ingle and Gosselin, No. 1,123,881, patented January 5, 1915, this vertical shaft 8 will be connected to impart a feed movement to the table similarly as in said patent. The shiftable pinion 134 which as already explained when moved to the left and in the position shown in Fig. 6 constitutes a connecting member in the transmission to the feed nut 30 of the boring bar, when adjusted to its other limiting position, i. e., to the right as seen in Fig. 6, is disconnected from the gear 137 of the boring feed distribution gearing, and connected to a gear 166 keyed on a shaft 167 journaled in the saddle, the inner end of this shaft having keyed thereto a bevel gear 168 which meshes with a bevel gear 169 loosely journaled on a shaft 170 fitted transversely in the saddle, the pinion 169 having rigid therewith and spaced therefrom by a connecting collar a spur pinion 171 meshing with a wide faced gear 172 rotatably and slidably fitted on a bushing sleeve 173 keyed as seen at 174 to the shaft 152. The gear 172 is equipped with a clutch face 175 at its inner end adapted to engage a coöperative clutch face 176 formed as a shoulder at the inner end of the bushing sleeve 173 when the gear 172 is slid inward. In this adjustment the drive is from the pinion 134 through gears 166, 168, 169 and 171 to the pinion 172 and thence on to the shaft 152 which through the bevel gearing 153, 154 operates the feed nut 157 on the vertical elevating screw, thus imparting power feed for vertical milling when the feed clutch connection 120, 123 is operative, or moving the saddle vertically for rapid traverse when the rapid traverse connection 124, 125 is operative. Upon shifting the gear 172 outward, i. e., to the right as seen in Fig. 8 or to the left as seen in Fig. 7, the clutch faces 175, 176 are disengaged and the gear 172 while preserving engagement with the gear 171 slides also into engagement with the gear 161 which as stated is keyed on the shaft 170. In this adjusted position either power feed or rapid traverse as explained will be transmitted to the shaft 170 and thence through the bevel gears 163, 164 to the vertical shaft 8 which operates the horizontal movement of the tool bar with reference to the work as for horizontal milling, this being as explained a movement of the column in the type of machine shown, or a movement of the work table in the table type of machine. The wide faced gear 172 is equipped with a hub collar formed with an annular groove 177 to be engaged by a suitable shifter arm.

Various arrangements of control devices for shifting the various change gears and clutches as described, may be provided, the same forming no part of the present invention, but I preferably and as shown employ a system of shifter devices operative by levers mounted without the saddle and so arranged that the several levers of a set for controlling the shifting elements for each part of the general system are mounted concentrically as shown in Fig. 1 wherein all the levers for operating the elements of the speed change mechanism are grouped to turn about the pivot 178, while the levers for controlling the feed changes are grouped to swing about the pivot 179 and the levers for controlling the distribution for boring and milling and for the rapid traverse are grouped about the center 180. For shifting the gear block 55 of the change speed mechanism a yoke plate 181 to engage the groove 65 is fitted to slide on a rod 182 extending lengthwise of the saddle, and is in geared connection as seen at 183 with a segment 184 pivoted to the saddle at 185, said segment at its opposite side engaging a segment 186 fast on a shaft 187 journaled to extend transversely outward of the saddle, this shaft 187 corresponding to the pivot 178. The outer end of shaft 187 has fast thereon an arm 188 bearing a suitable locking pin 189 adapted to fit into recesses in the front of the saddle to hold said arm in adjusted position. For operating the gear block 69, the groove 79 thereof is engaged by a similar yoke plate 190 fast on a bar 191 slidably mounted in the saddle, said bar having rack teeth thereon engaged by a segment 192 fast on a sleeve 193 rotatably fitted on the shaft 187, said sleeve projecting without the saddle and having fast at its end an arm 194 bearing a stop pin 195 similar to the pin 189. For sliding the gear 75, groove 80 is engaged by a similar yoke plate 196 which is engaged by teeth of a segment 197 fast on a second sleeve 198 rotatably mounted on the sleeve 193 and extending without the saddle having fast at its outer end an arm 199 equipped with a stop pin 200 similar to the pin 189. Thus all of the adjustable elements of the change speed mechanism have their controlling devices grouped about the pivot 178 where they are most convenient for control by the operator, and by retracting the several pins 189, 195, 200 as required the corresponding arms may be swung to adjust the speed changes as required. For shifting the gear block 108 the annular groove therein is engaged by a yoke plate 201 slidably guided on a bar 202 fixed horizontally of the saddle, this plate being engaged by a segment 203 fixed on a shaft 204 which is mounted to extend outward of the saddle and corresponding to the pivot 179, the outer end of this shaft having fixed thereon an arm 205 having a stop pin 206 at the end thereof. For sliding the gear 114 the groove 116 thereof is engaged by a yoke plate carried by a shifter bar 207 having rack teeth 208 engageable by a segment 209 fixed on a sleeve 210 rotatably fitted on the shaft 204 and having fast at the outer projecting end thereof an arm 211 having at its end a stop pin 212. For shifting the gear sleeve 96 the annular groove thereof is engaged by a yoke plate 213 slidingly mounted on a rod 214 fixed in the saddle, this yoke plate having rack teeth 215 engageable by a segment 216 fast at the inner end of a sleeve 217 rotatably fitted on the sleeve 210 and having fast on its outer projecting end an arm 218 equipped with a stop pin 219. Thus the several arms 205, 211 and 218 may be turned and set in adjusted position as required for varying the feed changes, the entire control of the feed change system being thus grouped about the single pivot 179. In like manner the groove 121 of the gears 119, 124 which control the connection from the feed change system or the rapid traverse to the distribution train, and the sliding gear 134 which controls the distribution as between milling and boring, are controlled from the common pivot 180 by levers 220, 221, respectively, through suitable segment devices in like manner as just described for the change speed and the change feed control. For shifting the gear 92 so as to bring it into engagement with either of the gears 89, 90 for making the forward feed or the reverse feed driving connection at will, the intermediate groove 95 of said gear is engaged by a yoke plate 222 slidingly mounted on a rod 223 fixed to the saddle, this plate having geared engagement at 224 with a short shaft 225 journaled in the front of the saddle and having fast on an outer projecting end thereof an arm 226 equipped with a stop pin 227. For shifting the gear 172 to control the distribution of power selectively for either vertical or horizontal milling, the groove 177 thereof is engaged by a yoke plate 228 slidably fitted on a bar 229 fixed to the saddle, this yoke plate being in geared engagement as seen at 230 with a segment fast at the upper end of a shaft 231 journaled in the saddle, and having in its lower projecting end an operating handle 232. A similar device (not shown) may be provided for shifting the gear 150 into any one of its three positions, such device being controlled by a shaft journaled in and projecting from the saddle having fast thereto an operating handle 233.

It will be observed that the feed change mechanism including the change gears mounted on the shafts 94, 104 and 110 is substantially a duplication of the speed change mechanism as to structure, and that such mechanisms permit a maximum range of changes in each case with a structure of the greatest simplicity and for each of said mechanisms involves only three shiftable elements for obtaining a range of twelve changes in each case. It will be further noted that while the feed rate is changed to correspond with every one of the twelve changes of speed for the tool bar since the drive for the feed system is taken from the immediate driving shaft 71 of the tool bar, it is also possible to obtain the full range of feed changes, i. e., twelve in number for every one of such twelve speed changes of the drive for rotating the tool bar, it also being possible to operate the feed mechanism through such range of changes for endwise movement of the tool bar when the rotary drive thereof is stationary. At such times, e. g., when the machine is used for splining or the like, the tool bar may be held positively against any rotary movement by the slotting clamp 41. It is to be further noted that by the utilization of the reduction and distribution train of the feed change system beginning with the pinion 119, for also transmitting selectively at will the rapid traverse distribution, the machine is rendered more compact and requires a materially reduced number of transmission and distribution gears. The present system of change gearing as applied to the speed change mechanism and the feed change mechanism is deemed an important feature of invention permitting as it does a selective range of twelve changes with only three shaft centers and with only three shifted elements, this being a matter of special importance in a machine of the present type where it is necessary to mount and arrange a relatively extensive system of gearing within the compact and relatively small dimension of the saddle housing. I also consider the present improved construction of differential for controlling the nut 30 of the spiral feed to be an important feature, since thereby the differential gears are all external toothed gears and hence of relatively smaller diameter, and of little momentum as compared with former types of construction wherein an internal gear has been employed for meshing with the intermediate pinions, such internal gear being of relatively large diameter acting as a fly wheel and preventing quick starting or stopping owing to its momentum.

With the present mounting of the tool bar 9 it is to be noted that it is mounted and arranged so as to be held accurately and driven to best advantage, having its forward bearing in the elongated driving sleeve 10 which extends from a point well to the rear of the saddle to the front thereof, and said bar having its rear bearing in the bushing 37 at the rear of the saddle; the elongated driving sleeve 10 also having spaced apart adjusting bearings constituted by the bushings 23, 25 which hold it closely alined against looseness and play. It is to be noted that the present construction provides means whereby the hand control for feeding the tool bar and for adjusting it bodily, is separate and distinct from the power control, being connected in shunt relation to the power control gearing. Also by virtue of the mounting of the hand operating shaft 143 to extend transversely inward of the saddle, i. e., at right angles to the change speed and change feed shafts with connections through the shaft 170 and gear elements associated therewith, the spiral feed of the tool bar may be transmitted directly thereto from the hand wheel at the front of the saddle and a direct reading of such bar feed as well as of the lateral and vertical milling feeds, taken from the index dial 146, such reading being closely accurate to indicate the tool bar movements, since no transmission through an extended train of gearing having back lash as in previous constructions, is involved. The arrangement of the mechanism permitting hand control by a transmission system at right angles to the speed and feed change systems thus permits both a more compact arrangement of such mechanisms, and makes possible a more direct connection from the hand control to the elements operated thereby without affecting the power change gear mechanism. By having the distribution gear 119 slidably fitted on the shaft 110 extended at the end of the feed change gear system and also selectively engageable with the rapid traverse gear 125, it is possible to consolidate the operative trains in a more compact space than would otherwise be possible as well as economizing in the number of gears required, since as noted the sliding distribution gear 119 and the gear reduction train driven therefrom serve dual functions in coöperation selectively with either the feed change system or the rapid traverse system; this applying also of course to the arrangement for power distribution for boring or for vertical, or for horizontal milling. The arrangement of the power distribution gear 134 slidably keyed on the shaft 135 to engage selectively the boring feed gear 137 or the milling feed gear 166 provides a transmission and control at this point of maximum simplicity, it being noted that this part of the power distribution is in parallelism with the speed and feed change mechanism while the shiftable gear 150 which controls the distribution of power as between the horizontal milling feed gear 161 and the vertical milling feed gear 151 is at right angles thereto.

By having the driving connection to the elevating screw 7 through the sleeve 173 having selective clutch connection at its end with the sliding wide faced gear 172 which also in its other position transmits power through the gear 161 for horizontal movement of the column, i. e., for horizontal milling, a relatively compact and simple distribution system for these two movements is provided. It is also to be noted that by having the reduction gears and distribution shifter gear 119 on the same series of shaft center lines as the feed change gears, the construction is simplified and made cheaper to produce as well as being more compact. By having the safety shear pin 132 extending through sleeves projecting without the saddle, it is thus made easy of access for renewal and this pin being located at the driven end of the feed changes and of the rapid traverse, and at the beginning of the power distribution system, thus takes care of the entire system of power distribution to protect the same from injury. The arrangement for driving the first speed shaft 52 directly from the bevel gearing 51 of the driving and reverse clutch on the vertical shaft, simplifies the construction and affords sufficient clearance so that the elevating screw 7 may be located close to the front or main guide way 3 as best shown in Fig. 1 thus bringing the operative draw of said screw into relatively close alinement with the guiding way and minimizing wear and cramping tendency. I am aware that the invention may be embodied in other specific forms as to its several features, and also that certain of the features of novelty set forth may be used advantageously apart from others, and I therefore desire the present embodiment to be considered in all respects as illustrative and not restrictive, referring to the appended claims rather than to the foregoing description to indicate the scope of the invention.

Having described my invention, what I claim as new and desire to secure by Letters Patent is:

1. A machine of the kind described, comprising a tool bar mounted and connected for rotation and endwise movement in variable ratios, a prime drive shaft therefor, change speed mechanism leading from said shaft and including a driven element connected to rotate said tool bar, and a change feed mechanism leading from said driven element and having as a driven member engaging the tool bar a nut engaging spiral threads of the tool bar with a differential device connected with the driving means for rotating the tool bar.

2. A machine of the kind described, comprising a tool bar having a mounting in a saddle for rotation and endwise movement in variable ratios, an elongated driving sleeve slidably keyed to said bar and extending to the forward end of the saddle, change speed mechanism for operating said bar including a driven shaft geared to the forward end of said driving sleeve, and a feed change mechanism connected to move the bar endwise and leading from said driven shaft whereby speed changes are transmitted as feed changes, and the feed changes of said feed change mechanism may also be made separately.

3. A machine of the kind described, comprising a tool bar having a mounting in a saddle for rotation and endwise movement in variable ratios, an elongated driving sleeve slidably keyed to said bar and extending to the forward end of the saddle, change speed mechanism for operating said bar including a driven shaft geared to the forward end of said driving sleeve, a feed change mechanism for operating a device to move the bar endwise and leading from said driven shaft whereby speed changes are transmitted as feed changes, and the feed changes of said feed change mechanism may also be made separately, and a device engaged by said feed mechanism for moving the bar endwise consisting in a nut in threaded engagement with a rear portion of said bar and a differential having gear elements engaged with the feed mechanism and other gear elements engaged with the driving sleeve of said tool bar.

4. A machine of the kind described, comprising a tool bar mounted for rotation and endwise movement in variable ratios, an elongated driving sleeve slidably keyed to said tool bar and extending to a forward portion thereof, a prime drive shaft, change speed mechanism leading therefrom and including a driven shaft geared to said driving sleeve at the forward end thereof to rotate the same and change feed mechanism leading from the last named shaft whereby speed changes are transmitted thereto, and a bar feeding device connected to be operated by said feed change mechanism consisting in a nut engaging spiral threads on a rear portion of the bar and having a differential engagement with said driving sleeve.

5. A machine of the kind described, comprising a tool bar having a mounting in a saddle for rotation and endwise movement in variable ratios, an elongated driving sleeve slidably keyed to said bar and extending out to the front end of the saddle, an elongated feed nut mounted in the saddle and in threaded engagement with a rear portion of said bar, and connections from the forward end of said driving sleeve for receiving power driving impulse and also for transmitting driving impulse to said feed nut.

6. A machine of the kind described, comprising a tool bar having a mounting in a saddle for rotation and endwise movement in variable ratios, an elongated driving sleeve slidably keyed to said bar and extending out to the front end of the saddle, means engaging said bar at the rear of said sleeve for feeding the same endwise, a connection from the forward end of said driving sleeve for receiving power driving impulse, and including a change speed mechanism, and other connection from the forward end of said sleeve including change feed mechanism for operating said feeding means.

7. A machine of the kind described, comprising a tool bar mounted for rotation and endwise movement in variable ratios and also for bodily lateral movement, a prime drive shaft therefor, change speed mechanism leading from said drive shaft for rotatably driving said bar, change feed mechanism including distribution gearing for transmitting feed to move the bar endwise and also for moving it bodily laterally at will, and a rapid traverse gear train from said prime drive shaft leading into the distribution gearing of said change feed mechanism, said distribution gearing having a shiftable clutch device for selectively engaging said rapid traverse train or said change feed mechanism.

8. A machine of the kind described, comprising a tool bar mounted in a saddle for rotation and endwise movement in variable ratios, said saddle mounted for feed movement vertically and also horizontally, means for rotatably driving said tool bar, change feed mechanism for feeding said tool bar endwise at variable ratios, and also having distribution gearing for feeding the saddle vertically and horizontally, a rapid traverse gear train for moving said saddle and said bar at relatively higher rates, and running into the distribution gearing of said change feed mechanism whereby the same distribution gearing serves both for transmitting rapid traverse movement and relatively slow change feed movements, said distribution gearing having a shiftable clutch element capable of selectively engaging said change feed mechanism or said rapid traverse gear train.

9. A machine of the kind described, comprising a tool bar mounted in a saddle for rotation and endwise movement in variable ratios, an elongated driving sleeve slidably keyed to said bar and extending to the front end of the saddle, the forward portion of said sleeve being flared away from said bar, and a bearing bushing adjustably fitted into said saddle and affording bearing for said forward flared end of said driving sleeve, whereby upon adjustment of said bushing, wear between the same and said driving sleeve may be taken up.

10. In a machine of the kind described, a tool bar, an elongated sleeve in which said bar is slidably keyed, a saddle providing spaced apart bearings for said sleeve, the sleeve extending to the front of said saddle, and said saddle also providing a separate bearing at the rear thereof for said tool bar, means for rotating said sleeve, and means engaging said tool bar for feeding the same endwise.

11. In a machine of the kind described, a tool bar, an elongated sleeve in which said tool bar is slidably keyed, a saddle provided with bar is slidably keyed, spaced apart bearings in which said sleeve is journaled and also with a separate bearing for said bar at the rear of said saddle and spaced from said sleeve, a nut engaged with a spiral thread of said tool bar between said sleeve and the last named bearing, means for rotating said sleeve, and a differential mechanism for rotating said nut.

12. In a machine of the kind described, a tool bar, an elongated sleeve in which said bar is slidably keyed, a saddle provided with spaced apart bearings for said sleeve, the forward end of said sleeve extending to the front of the saddle and flaring outward, means for adjusting the bearings of said saddle with respect to said sleeve, said saddle having a separate bearing for said bar at the rear thereof and spaced from said sleeve, means acting on said bar between the last named bearing and said sleeve for moving the same endwise, and means for rotating said sleeve to rotate said bar.

13. In a machine of the kind described, a tool bar, an elongated sleeve in which said bar is slidably keyed, a saddle provided with spaced apart bearings for said sleeve, the forward end of said sleeve extending to the front of the saddle and flaring outward, means for adjusting the bearings of said saddle with respect to said sleeve, said saddle having a separate bearing for said bar at the rear thereof and spaced from said sleeve, means acting on said bar between the last named bearing and said sleeve for moving the same endwise, means for rotating said sleeve to rotate said bar, prime driving means and connections therefrom to operate said sleeve driving means and said bar feeding means in selectively variable ratios.

14. In a machine of the kind described, a tool bar, a sleeve in which said bar is slidably keyed, a saddle providing bearings for said sleeve, a nut engaging a spiral thread of said bar, and a differential device for controlling said nut consisting in an external gear loosely mounted concentric with said bar, external gears rigid with said nut and with said sleeve respectively, pinions on fixed pivots making geared connection from said loosely mounted gear to the gear on said nut, and a rotatable gear ring mounted concentric with said sleeve and having pivoted thereto pinions making connection between the gear on said sleeve and said loosely mounted gear.

15. In a machine of the kind described, a tool bar, a sleeve in which said bar is slidably keyed, a saddle providing bearings for said sleeve, a nut engaging a spiral thread of said bar, a differential device for controlling said nut consisting in an external gear loosely mounted concentric with said bar, external gears rigid with said nut and with said sleeve respectively, pinions on fixed pivots making geared connection from said loosely mounted gear to the gear on said nut, and a rotatable gear ring mounted concentric with said sleeve and having pivoted thereto pinions making connection between the gear on said sleeve and said loosely mounted gear, a prime drive shaft and sets of change gearing connecting the same with said sleeve and with said gear ring respectively.

16. In a machine of the kind described, a tool bar, a sleeve in which said bar is slidably keyed, a nut engaging a spiral thread on said bar, a differential device including an external gear on said sleeve, an external gear loosely mounted concentric therewith, a loosely mounted external ring gear concentric with said sleeve, and having pinions pivoted thereto connecting the gear fixed to said sleeve with said loosely mounted gear, said nut having a gear rigid therewith and pinions mounted on fixed pivots engaging the gear of said nut with said loosely mounted gear.

17. In a machine of the kind described, a tool bar, a sleeve in which said bar is slidably keyed, a nut engaged with a spiral thread of said tool bar, said nut and said sleeve having mountings in spaced apart relation and having external spur gears rigid therewith at their adjacent ends, an external gear loosely mounted between said nut and said sleeve and concentric therewith, a gear ring rotatably mounted concentric with said sleeve, and means for producing differential rotation between said nut and said tool bar by the rotation of said gear ring, and through said loosely mounted intermediate gear.

18. In a machine of the kind described, a tool bar mounted for rotation and endwise movement, means for rotating said bar, a nut engaging a spiral thread of said bar to feed it endwise and having a differential device in driving engagement therewith, a prime drive shaft having connection by a feed change system with a differential device, and hand operating means for feeding said bar engageable directly with said differential device without affecting said feed change mechanism.

19. In a machine of the kind described, a tool bar mounted for rotation and endwise movement, a prime drive shaft having a speed change system connecting the same with said tool bar for rotating it and a feed change mechanism connecting the same with said tool bar for feeding the bar endwise, a differential device operated by said feed change mechanism and having means associated therewith for producing endwise movement of the bar, and a hand operating device selectively connectible to engage said differential device directly for feeding said bar manually without the interposition of said feed change mechanism.

20. In a machine of the kind described, a tool bar mounted for rotation, for endwise movement and for bodily lateral movement, power operating means including a change feed system for feeding said bar endwise and moving it laterally, and a hand operating device connectible directly for either feeding said bar endwise or for moving it bodily laterally at will without the interposition of said feed change mechanism.

21. In a machine of the kind described, a tool bar mounted for rotation, for endwise movement and for bodily lateral movement either vertically or horizontally at will, power operated means for effecting said endwise movement and said bodily lateral movement including a change feed mechanism from a prime drive shaft, and hand operating means engageable directly either with said means for moving the bar endwise, or with said means for moving the bar either vertically or horizontally at will without the interposition of said feed change mechanism.

22. In a machine of the kind described, a tool bar, a saddle in which said bar is mounted for rotation and endwise movement, feed change mechanism mounted in said saddle on a plurality of centers extending lengthwise thereof and in parallelism with said bar having connection to be power driven from a prime drive shaft, and a hand operating device for engaging the bar to operate the same directly, including shafting extending transversely outward of the saddle at right angles to said feed change mechanism.

23. In a machine of the kind described, a tool bar, a saddle in which said tool bar is mounted for rotation and endwise movement, a prime drive shaft connecting with said bar through change speed mechanism and change feed mechanism for rotating the bar and feeding it endwise respectively, said mechanisms mounted on centers extending lengthwise of the saddle and in parallelism with said bar, and a hand operating device engageable with said bar for moving the same directly without the interposition of said feed change mechanism, and extending transversely outward of the saddle at right angles to said feed change mechanism.

24. In a machine of the kind described, a tool bar, a saddle in which said bar is mounted for rotation and endwise movement, power operating means including change feed mechanism mounted in said saddle for operating said bar, and a hand operating device for engaging said bar directly without the interposition of said feed change mechanism for moving the same endwise, said hand operating device including a shaft extending transversely of the saddle to the front thereof and equipped with a graduated dial for direct reading of the bar feed.

25. In a machine of the kind described, a tool bar, a saddle in which said bar is mounted for rotation and endwise movement, means for moving said bar endwise by power including a change feed mechanism in said saddle connected to a prime drive shaft, means for moving said saddle to shift said bar bodily laterally, and a hand operating device having connections selectively engageable for either moving said bar endwise or for moving said saddle directly without the interposition of said feed change mechanism, said hand operating device including a shaft extending outward of the saddle and equipped with an index device permitting direct reading of either the endwise feed of the bar or the bodily lateral feed thereof by hand.

26. In a machine of the kind described, a tool bar mounted for rotation and endwise movement and also for bodily lateral movement, a gear train for moving said bar endwise, a second gear train for moving said bar laterally, the driving gears of said two trains being of the same diameter and mounted side by side, and a power distribution system including a sliding gear shiftable selectively into operating relation with either of said gears for feeding the bar endwise or for moving it laterally at will.

27. In a machine of the kind described, a tool bar mounted for rotation and endwise movement and also for bodily lateral movement, a gear train for moving said bar endwise, a second gear train for moving said bar laterally, the driving gears of said two trains being of the same diameter and mounted side by side, and a power distribution system including change feed mechanism leading from a prime drive shaft and a gear slidable into operative relation selectively with either of said two gears for feeding the bar endwise or for moving it laterally at will.

28. In a machine of the kind described, a tool bar mounted for rotation and endwise movement and also for bodily lateral movement, a gear train for moving said bar endwise, a second gear train for moving said bar laterally, the driving gears of said two trains being of the same diameter and mounted side by side, and a power distribution system including feed change mechanism leading from a prime drive shaft and a rapid traverse mechanism also leading from said prime drive shaft and both leading into a gear slidably mounted to engage either of said two gears at will for moving the bar endwise or feeding it laterally.

29. In a machine of the kind described, a tool bar, a saddle in which said tool bar is mounted for rotation and endwise movement, means for moving said saddle vertically, means for moving said saddle horizontally, a power distribution system including change-speed mechanism and change feed mechanism leading from a prime drive shaft mounted in said saddle on centers extending in parallelism with said bar, means mounted in parallelism therewith for selectively engaging said power transmission system for either moving said bar endwise or for moving said saddle, and connections mounted on centers extending transversely outward of the saddle for selectively engaging said power distribution system with either said means for moving the saddle vertically or with said means for moving the same horizontally at will.

30. In a machine of the kind described, a tool bar, a saddle in which said bar is mounted for rotation and endwise movement, means for moving said saddle vertically, means for moving said saddle horizontally, a power distribution system, gearing mounted in parallelism with said bar and having a shiftable element to engage selectively said power distribution system for moving said bar endwise, or for moving said saddle, and gearing extending transversely of said bar and having an element shiftable to engage selectively said power distribution system for either moving said saddle vertically or horizontally at will.

31. A machine of the kind described, comprising a tool bar mounted for rotation, for endwise movement, and for bodily lateral movement, means for operating said bar including change speed mechanism and a change feed mechanism leading from a prime drive shaft for rotating said bar and moving it endwise or laterally at will, a rapid traverse gear train also leading from said prime drive shaft, a gear element shiftable to engage selectively said feed change mechanism of said rapid traverse gear train to be driven thereby, and distribution gearing constantly engaged with said gear element and having provision for moving said bar endwise or for moving it laterally at will.

32. A machine of the kind described, comprising a tool bar, a saddle in which said tool bar is mounted for rotation and endwise movement, means for feeding said saddle to move said bar bodily laterally, change speed mechanism and change feed mechanism leading from a prime drive shaft for rotating said bar and moving the same endwise respectively, a rapid traverse gear train also leading from said prime drive shaft, a gear element shiftable to engage said rapid traverse train in one position and to disengage the same and to engage the driven end of said feed change mechanism in another position, and reduction gearing leading from said gear element with connections for either moving said bar endwise or for feeding said saddle at will.

33. A machine of the kind described, comprising a tool bar, a saddle in which said bar is mounted for rotation and endwise movement, means for feeding said saddle to move the bar bodily laterally, feed change mechanism leading from a prime drive shaft and including at the driven end thereof an extended shaft, a gear element slidably fitted on said shaft, shiftable to one position for engaging with said feed change mechanism, rapid traverse gearing leading from said prime drive shaft with which said gear element is engageable in another position thereof, and distribution gearing driven by said gear element and having provision for either moving said bar endwise or for moving said saddle at will.

34. A machine of the kind described, comprising a tool bar, a saddle in which said bar is mounted for rotation and endwise movement, a vertical column equipped with a main guide way with which said saddle is engaged adjacent the front thereof for sliding movement, a vertically mounted prime drive shaft, change speed mechanism leading directly from said prime drive shaft for rotating said tool bar, and an elevating screw engaged with said saddle and mounted relatively close to said main front guideway.

35. A machine of the kind described, comprising a tool bar, a saddle in which said bar is mounted for rotation and endwise movement, a column equipped with a main guide way with which said saddle is slidably engaged adjacent the front thereof, an elevating screw engaged with the saddle and extending relatively close to said main guide way, a vertical prime drive shaft, and change gearing for operating said tool bar housed in said saddle and mounted on a plurality of centers in parallelism with the tool bar, the first speed shaft of said change gearing having direct engagement with said vertical shaft whereby clearance is afforded for said elevating screw.

36. In a machine of the kind described, a tool bar mounted for rotation and endwise movement and also for bodily lateral movement, change speed mechanism leading from a prime drive shaft for operating said bar, rapid traverse gearing also leading from said prime drive shaft, a gear element selectively engageable with said rapid traverse gearing or with said change feed mechanism, and distribution gearing leading from said gear element with provision for operating said bar and having at the driving end thereof a safety shear pin.

37. A machine of the kind described, comprising a tool bar, a saddle in which said bar is mounted for rotation and endwise movement, means for moving said saddle, means for feeding said saddle to move the bar laterally, feed change mechanism leading from a prime drive shaft for operating said bar, rapid traverse gearing also leading from said prime drive shaft, distribution gearing selectively engageable with said feed change mechanism or with said rapid traverse gearing and having connections for feeding the bar endwise or for moving said saddle, and having in an initial transmitting portion thereof a safety shear pin for the purpose stated.

38. A machine of the kind described, comprising a tool bar, a saddle in which said bar is mounted for rotation and endwise movement, means for moving said saddle, means for feeding said saddle to move the bar laterally, feed change mechanism leading from a prime drive shaft for operating said bar, rapid traverse gearing also leading from said prime drive shaft, distribution gearing selectively engageable with said feed change mechanism or with said rapid traverse gearing and having connections for feeding the bar endwise or for moving said saddle, and having in an initial transmitting portion thereof a safety shear pin, said shear pin passing transversely through a sleeve and a shaft constituting elements of said distribution gearing and extending without said saddle.

39. A machine of the kind described, comprising a tool bar, a saddle in which said bar is mounted for rotation and endwise movement, speed change mechanism and feed change mechanism mounted in said saddle and leading from a prime drive shaft for rotating said bar and moving it endwise respectively, said feed change mechanism mounted on a plurality of centers extending in parallelism with said bar, and a reduction and distribution gear system having connections for moving said bar endwise and for operating said saddle, mounted on a plurality of centers in alinement with the centers of said feed change mechanism.

40. In a machine of the kind described, a tool bar, a saddle in which said bar is mounted for rotation and endwise movement, means for moving said saddle vertically, means for moving said saddle horizontally, a power distribution system leading from a prime drive shaft and housed in said saddle, and means for connecting said power distribution system with either of said saddle moving means at will consisting in a shaft geared to the vertical moving means of said saddle equipped with a sleeve having a clutch at its end, a wide faced gear slidable on said sleeve and having a clutch face to engage the clutch of said sleeve in one position, and gear elements connectible by said gear when in another position and having connection with the operating means for moving the saddle horizontally.

41. A machine of the kind described, comprising a tool bar, a relatively long driving sleeve in which the forward portion of said tool bar is slidably keyed, a saddle in which said sleeve is journaled, means for rotating said sleeve having engagement therewith at the front end thereof and forward of the saddle, and means for feeding said tool bar endwise having connection with the rear end of said driving sleeve to be controlled thereby.

42. A machine of the kind described, comprising a tool bar, a relatively long driving sleeve in which the forward portion of said tool bar is slidably keyed, a saddle in which said sleeve is journaled, means for rotating said sleeve having engagement therewith at the front end thereof and forward of the saddle, and means for feeding said tool bar endwise consisting in a nut engaging a spiral groove of said tool bar, and a differential device equipped with planetary gearing for operating said nut, said planetary gearing having geared connection with the rear end of said sleeve to be controlled thereby.

In testimony whereof, I have signed my name to this specification.

WILLIAM R. CARY.